United States Patent
Tsukamoto

(10) Patent No.: US 7,419,416 B2
(45) Date of Patent: Sep. 2, 2008

(54) ELECTRON EMISSION ELEMENT, ELECTRON SOURCE, IMAGE DISPLAY DEVICE, AND METHOD OF MANUFACTURING THE SAME

(75) Inventor: Takeo Tsukamoto, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/021,473

(22) Filed: Dec. 23, 2004

(65) Prior Publication Data

US 2006/0009107 A1  Jan. 12, 2006

(30) Foreign Application Priority Data

Dec. 26, 2003 (JP) .............................. 2003-432500

(51) Int. Cl.
*H01J 9/00* (2006.01)

(52) U.S. Cl. .......................................... 445/24; 445/49

(58) Field of Classification Search ............. 445/23–25, 445/49–51
See application file for complete search history.

(56) References Cited

U.S. PATENT DOCUMENTS

| | | | |
|---|---|---|---|
| 4,904,895 A | 2/1990 | Tsukamoto et al. | 313/336 |
| 5,847,495 A | 12/1998 | Yamanobe et al. | 313/310 |
| 5,986,389 A | 11/1999 | Tsukamoto | 313/310 |
| 6,147,449 A | 11/2000 | Iwasaki et al. | 313/495 |
| 6,171,162 B1 | 1/2001 | Iwasaki et al. | 446/6 |
| 6,179,678 B1 | 1/2001 | Kishi et al. | 445/24 |
| 6,184,610 B1 | 2/2001 | Shibata et al. | 313/309 |
| 6,231,413 B1 | 5/2001 | Tsukamoto | 445/24 |
| 6,246,168 B1 | 6/2001 | Kishi et al. | 313/495 |
| 6,288,494 B1 | 9/2001 | Tsukamoto et al. | 315/169.1 |
| 6,472,814 B1 | 10/2002 | Yamanobe et al. | 313/495 |
| 6,515,640 B2 | 2/2003 | Tsukamoto et al. | 345/75.2 |
| 6,626,719 B2 | 9/2003 | Ono et al. | 445/24 |
| 6,843,696 B2 | 1/2005 | Kitamura et al. | 445/24 |
| 6,848,962 B2 | 2/2005 | Kitamura et al. | 445/24 |
| 6,858,990 B2 | 2/2005 | Tsukamoto | 315/169.1 |
| 2002/0057045 A1 | 5/2002 | Tsukamoto | 313/309 |
| 2002/0060516 A1 | 5/2002 | Kawate et al. | 313/495 |
| 2002/0074947 A1 | 6/2002 | Tsukamoto | 315/169.3 |
| 2002/0132041 A1 | 9/2002 | Yamanobe et al. | 427/77 |

(Continued)

FOREIGN PATENT DOCUMENTS

JP    2002-358874    12/2002

(Continued)

*Primary Examiner*—Joseph L Williams
(74) *Attorney, Agent, or Firm*—Fitzpatrick, Cella, Harper & Scinto

(57) ABSTRACT

A method of manufacturing an electron emission element, including forming common wire electrodes (signal lines) (4*a*, 4*b*) on a substrate (1) and forming electron emission units including fibrous material assemblies (6*a*, 6*b*) on the common wire electrodes (4*a*, 4*b*), respectively, for preventing abnormal discharge caused by an antistatic film (7) with no deterioration in characteristics of the electron emission element. The electrode forming is followed by forming resist patterns (40*a*, 40*b*) covering at least part of the common wire electrodes (4*a*, 4*b*) before the antistatic film is formed. Thereafter the resist patterns (40*a*, 40*b*) on the common wire electrodes (4*a*, 4*b*) are removed together with the antistatic film (7) before the electron emission unit is formed, so that the electron emission units made of the fibrous material assemblies (6*a*, 6*b*) are formed on the common wire electrodes (4*a*, 4*b*) from which the resist patterns (40*a*, 40*b*) have been removed.

3 Claims, 5 Drawing Sheets

U.S. PATENT DOCUMENTS

| | | | |
|---|---|---|---|
| 2003/0006684 A1 | 1/2003 | Kawate et al. | 313/311 |
| 2003/0048055 A1 | 3/2003 | Ishikura et al. | 313/311 |
| 2004/0060477 A1 | 4/2004 | Iwaki et al. | 106/472 |
| 2004/0063839 A1 | 4/2004 | Kawate et al. | 524/439 |
| 2004/0155567 A1 | 8/2004 | Kyogaku et al. | 313/310 |
| 2004/0245904 A1 | 12/2004 | Kitamura et al. | 313/310 |
| 2005/0032255 A1 | 2/2005 | Kitamura et al. | 438/20 |

FOREIGN PATENT DOCUMENTS

| | | |
|---|---|---|
| JP | 2003-068192 | 3/2003 |

ELECTRON EMISSION ELEMENT, ELECTRON SOURCE, IMAGE DISPLAY DEVICE, AND METHOD OF MANUFACTURING THE SAME

BACKGROUND OF THE INVENTION

1. Field of the Invention

The present invention relates to an electrode disposed on a substrate, an electron emission element having a fibrous electron emission member disposed on the electrode, an electron source having a plurality of the electron emission elements, an image display device including the electron source, and a method of manufacturing the same.

2. Description of the Related Art

In recent years, there has been suggested a panel image display device with electron emission elements such as, for example, field emission elements (FE elements), metal-insulator-metal elements (MIM elements), or surface conduction electron emission elements (SCE elements).

This image display device includes, for example, an electron source having a plurality of matrix-driven electron emission elements formed on an electrically insulative substrate and an opposing image forming member for displaying an image by irradiation with electron beams. Thus, it generates a light-emitting image by applying a high voltage to the image display member to accelerate electrons emitted from the electron emission elements so as to cause the electrons to be incident on the image forming member such as a fluorescent substance.

If the high voltage is applied to the image display member, an electric potential is generated on the insulated surface region around the electron emission elements which counter an anode due to X-ray and charged ion irradiation. The higher the impedance of the substrate is, the longer the time constant of the electric potential is, and therefore a charged condition remains as it is. Furthermore, an emission of electrons from the electron emission elements in this condition causes the electrons to collide with the charged substrate surface. At that time, if the acceleration of the electrons causes charged particles such as electrons or ions to be implanted into the substrate surface, secondary electrons are generated, and particularly under a high electric field, abnormal discharge will occur. Therefore, it significantly deteriorates the electron emission characteristic of the electron emission elements, and in the worst case the electron emission elements may be destroyed, as is experimentally verified.

Conventionally, for preventing the above abnormal discharge in the image display device with the SCE elements, there is a known method of forming a high-resistant conductive film as an antistatic film by vacuum deposition or sputter deposition or of forming an antistatic film by spraying a solution containing an antistatic material (refer to, for example, Japanese Laid-Open Patent Publication (Kokai) No. 2002-358874).

If the formation of the antistatic film is applied particularly to an electron emission element that has an electron emission unit made of a fibrous material assembly among the electron emission elements, however, there is a problem that the fibrous material is stained at the formation of the antistatic film and thus the electron emission characteristic deteriorates, thereby increasing color drift, uneven luminance, or a feeling of noise caused by fluctuations. Furthermore, particularly in the formation of the antistatic film by spraying the solution containing the antistatic material, a capillary phenomenon easily causes the solution to be caught into the fibrous material formation region. It then leads to a problem that the electron emission element is susceptible to a deterioration in the electron emission characteristic (VI characteristic) caused by bending or a collapse of the fibrous material due to an adhesion of the solution, an occurrence of an uneven formation of the antistatic film caused by the solution around the fibrous material formation region caught into the region, and excessive dirt of the fibrous material.

SUMMARY OF THE INVENTION

It is an object of the present invention to prevent the abnormal discharge caused by an antistatic film with no deterioration in the characteristics of an electron emission element.

To achieve the above object, according to a first aspect of the present invention, there is provided an electron emission element, comprising an electrode, disposed on a substrate, and an electron emission unit made substantially of at least one fibrous member disposed on the electrode. An antistatic film is formed in a region other than the electron emission unit.

The region other than the electron emission unit means a substrate surface in a vicinity of the electron emission unit. The region in a vicinity of the electron emission unit means a region where an orbit of electrons emitted from the electron emission unit is affected. More specifically, if there are disposed a plurality of electron emission elements each having the electron emission unit on the insulated substrate, it means an insulated substrate portion between the plurality of electron emission elements.

According to a first aspect of the present invention, preferably the fibrous material is a carbon nano-tube or a graphite nanofiber.

According to a second aspect of the present invention, there is provided an electron source comprising a plurality of electron emission elements disposed on the substrate, according to the first aspect of the present invention.

According to a third aspect of the present invention, there is provided an image display device wherein an electron source according to the second aspect of the present invention is disposed opposite an image forming member for displaying an image by irradiation with electron beams.

According to a fourth aspect of the present invention, there is provided a method of manufacturing an electron emission element comprising the steps of forming an electrode on a substrate and forming an electron emission unit made of a fibrous material assembly on the electrode. The step of forming the electron emission unit is preceded by a step of forming an antistatic film at least on the substrate.

In the fourth aspect of the present invention, preferably the forming of the antistatic film includes a step of applying a solution that contains an antistatic material or a dispersion liquid that contains the same.

Preferably, the step of forming the electrode is followed by a step of forming a resist pattern covering at least part of the electrode before the antistatic film is formed, and thereafter a step of removing the resist on the electrode together with the antistatic film is performed before the forming of the electron emission unit, so that the electron emission unit made of the fibrous material assembly is formed on the electrode from which the resist has been removed. Preferably, the step of forming the electron emission unit is performed to form a carbon nano-tube or a graphite nanofiber on the electrode.

According to a fifth aspect of the present invention, there is provided a method of manufacturing an electron source, comprising the step of forming a plurality of electron emission elements on a substrate. The electron emission elements are each formed according to the fourth aspect of the present invention. Furthermore, according to a sixth aspect of the present invention, there is provided a method of manufacturing an image display device, comprising the step of oppositely disposing an electron source, manufactured according to the method of manufacturing an electron source according to the fifth aspect of the present invention, and an image forming member for displaying an image by irradiation with electron beams.

In all of the electron emission elements, the electron source, and the image display device according to the preferred embodiments, no antistatic film is formed on the electron emission unit made of a fibrous material assembly. Therefore, they are free from deterioration in characteristics caused by bending, collapse, or dirt of the fibrous material due to an adhesion of an antistatic material or the like and can prevent the abnormal discharge caused by the antistatic film.

In addition, according to the methods of manufacturing the electron emission element, the electron source, and the image display device of the preferred embodiments, the antistatic film is formed before the formation of the fibrous material. Therefore, no antistatic material adheres to the fibrous material at the formation of the antistatic film, thereby preventing a harmful effect of the adhesion and reliably preventing abnormal discharge caused by the antistatic film.

Therefore, according to the preferred embodiments of the present invention, it is possible to achieve bright and clear pictures with reduced noise caused by fluctuations due to a decrease in color drift or uneven luminance even in an image display device having a large area.

DESCRIPTION OF THE PREFERRED EMBODIMENTS

Figure 1:
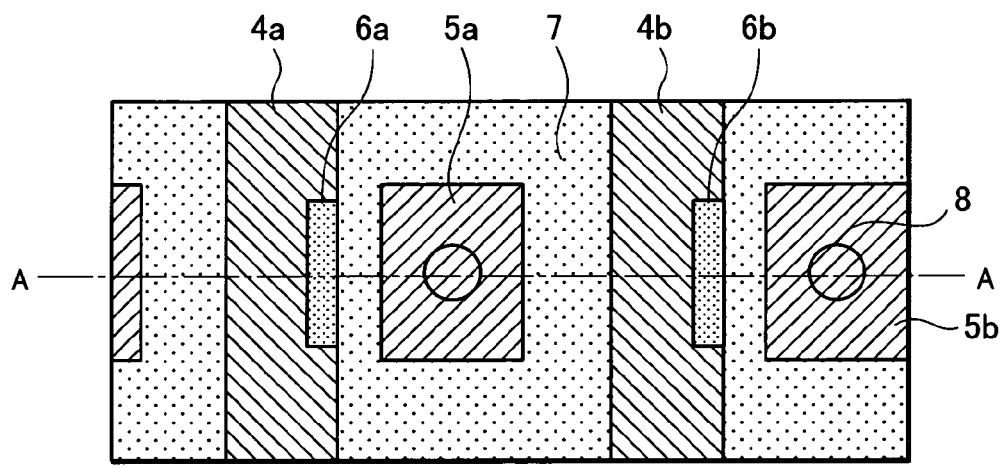
FIG. 1 is a plan view of an electron source manufactured in a first embodiment of the present invention.

The present invention is directed to an electron emission element having an electron emission unit made of at least one fiber, preferably, a fibrous material assembly, and to an electron source and an image display device using the same. The fibrous material is typically, for example, a carbon nano-tube having a structure of carbon hexagonal net planes cylindrically arranged or a graphite nanofiber having a structure of carbon hexagonal net planes stacked in a platelet or herring-bone (or cup-stacked) shape. The fibrous material according to the present invention is not limited to these materials, but other materials can be used only if they are fibrous substances having conductivity.

An antistatic film used in the present invention is only required to prevent abnormal discharge caused by charging or to prevent a harmful effect on a beam orbit of electrons emitted from the electron emission unit. More specifically, a film having a relatively high resistance on the order of $10^7$ to $10^{14}$ ohms/square is preferably used. A concrete material that can be used is, for example, metal oxide or carbon. As a metal oxide, chrome, nickel, copper or other oxide is preferable. As a carbon, amorphous carbon is preferable. The reason why these materials are preferable is that all of them are low in their secondary emission coefficient.

As a method of forming the antistatic film, for example, vacuum deposition or sputter deposition are available. In these methods, however, a burden on equipment or facilities increases as the substrate becomes larger, and the tact time increases, too. On the other hand, the antistatic film formed by coating of a solution containing the antistatic material or a dispersion liquid is preferable in that it can be formed by using simple equipment and in short tact time independently of the substrate size. The coating of the solution or the dispersion liquid can be carried out by a spray method, a dip method, a spin coat method or the like. The antistatic film used in the present invention is preferably disposed in such a way as to cover a substrate surface (an insulated surface) in the vicinity of the electron emission unit. The reason is that covering the insulated surface in the vicinity of the electron emission unit prevents not only unexpected discharge, but also a harmful effect on the orbit of electrons emitted from the electron emission unit as stated above. In this regard, the vicinity of the electron emission unit means, for example, an insulated substrate portion between a plurality of electron emission elements if the plurality of electron emission elements each having the electron emission unit are disposed on the insulated substrate.

Preferred embodiments of the present invention will now be described in detail in conjunction with the accompanying drawings.

First Embodiment

A first embodiment of the present invention will first be described with reference to FIG. 1 and FIG. 2.

This embodiment relates to manufacturing an electron source having electron emission elements arranged in matrix. FIG. 1 shows a plan view of the electron source manufactured according to this embodiment. FIG. 2 shows a cross-sectional view taken on line A-A of FIG. 1.

Figure 2:
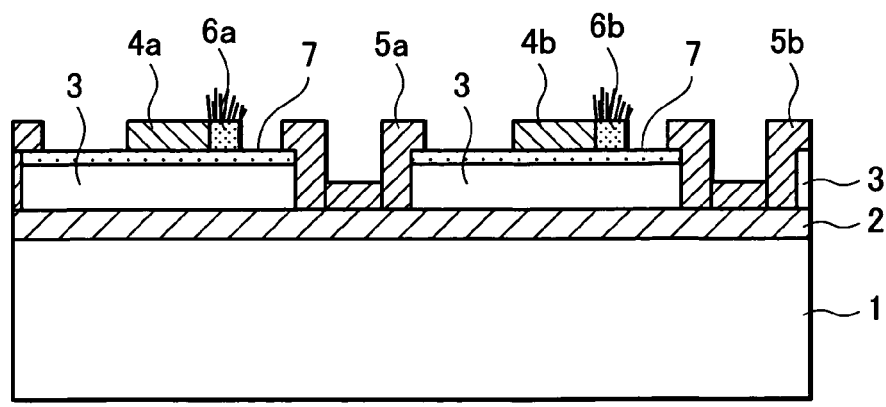
FIG. 2 is a cross-sectional view taken along line A-A of FIG. 1.

In FIG. 1 and FIG. 2, there are shown a substrate 1, a common wire electrode (scan line) 2, an interlayer insulation layer 3, common wire electrodes (signal lines) 4a and 4b, gate electrodes (extraction electrodes) 5a and 5b, fibrous material assemblies (assemblies of carbon nano-tubes in this embodiment) 6a and 6b, an antistatic film 7, and a contact hole 8.

The following describes a manufacturing procedure in this embodiment.

(1) ITO is deposited in a thickness of 500 nm on a surface of the substrate 1 made of a PDP glass, and then the scan common wire electrode 2 is formed in a width of 600 μm using a photolithographic technique.

(2) Subsequently, the interlayer insulation layer 3 of about 10 μm in thickness is formed with principal components of lead oxide and silica through a coating and baking processes.

(3) Subsequently, oxide particles made by doping tin oxide with antimony oxide are dispersed in a 1-1 ethanol-isopropanol mixture. The surface is then coated with the mixture containing solid material of about 0.1 weight percent using a spray device under the conditions of a liquid pressure of 0.025 MPa, an air pressure of 1.5 kg/cm$^2$, a substrate-nozzle head distance of 50 mm, and a head velocity of 0.8 m/sec. Thereafter, through 425 square and 20 min atmospheric baking, the antistatic film 7 is formed.

(4) Subsequently, the contact hole 8 is formed in a diameter of about 150 µm in the interlayer insulation layer 3 by the photolithographic technique.

(5) Chromium of about 1 µm in thickness is formed on the entire surface of the substrate 1 by deposition and then the common wire electrodes (signal lines) 4a and 4b and the gate electrodes (extraction electrodes) 5a and 5b are formed by the photolithographic technique.

(6) By using printing paste material containing the fibrous material (carbon nano-tubes in this embodiment) and properly containing organic material, inorganic material, and photosensitive organic material, the fibrous material assemblies 6a and 6b that are electron emission units are formed by printing on a part of the common wire electrodes (signal lines) 4a and 4b, respectively. Thereafter, they are precisely shaped by photolithography using light transmitted from a rear face of the substrate 1.

By the aforementioned method, as apparent from the plan view of FIG. 1, antistatic film 7 is formed on the entire insulative surface of the electron emission element as well as the peripheral portion thereof, thereby reliably bringing out the charging performance.

If an attempt is made to obtain a certain amount of electron emission current without a formation of the antistatic film 7, a driving voltage gradually rises with time and further an electron beam position easily fluctuates. With a formation of the antistatic film 7, however, a constant driving voltage is achieved in driving. In addition, it is possible to prevent fluctuations in a fluorescent spot position of the obtained electron beam for a long period of time.

Furthermore, the antistatic film 7 preferably is formed before the formation of the fibrous material assemblies 6a and 6b, thereby preventing a deterioration in a threshold characteristic, a VI characteristic, and the like related to the electron emission.

Second Embodiment

A second embodiment of the present invention will now be described with reference to FIG. 3 and FIG. 4.

This embodiment also relates to manufacturing an electron source having electron emission elements arranged in a matrix similarly to the first embodiment. FIG. 3 shows a plan view of the electron source manufactured according to this embodiment. FIG. 4 shows a cross-sectional view taken on line B-B of FIG. 3.

Figure 3:
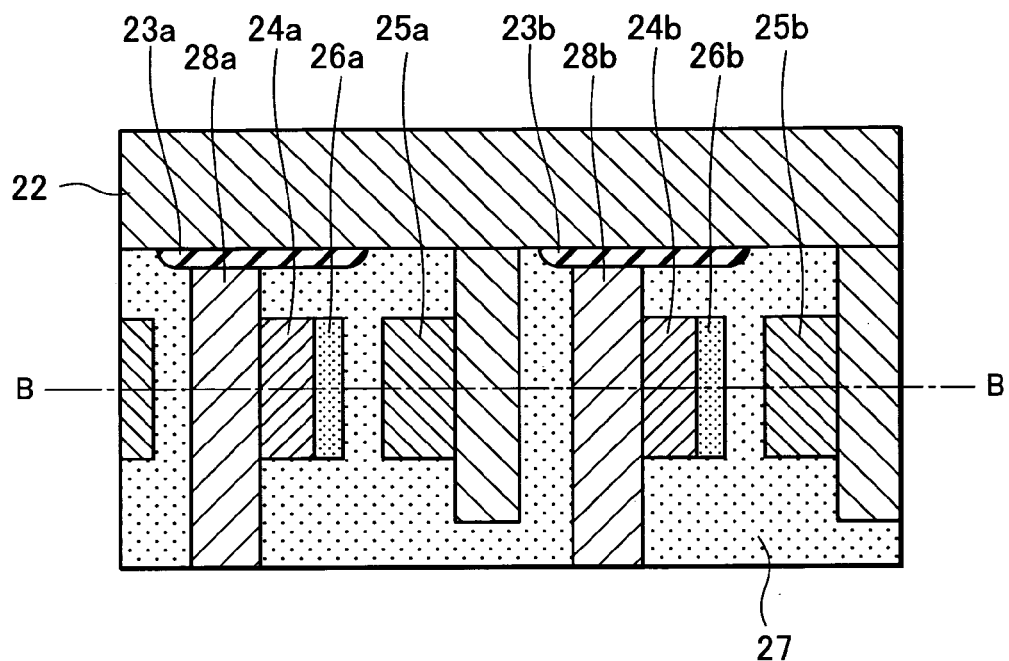
FIG. 3 is a plan view of an electron source manufactured in a second embodiment of the present invention.
Figure 4:
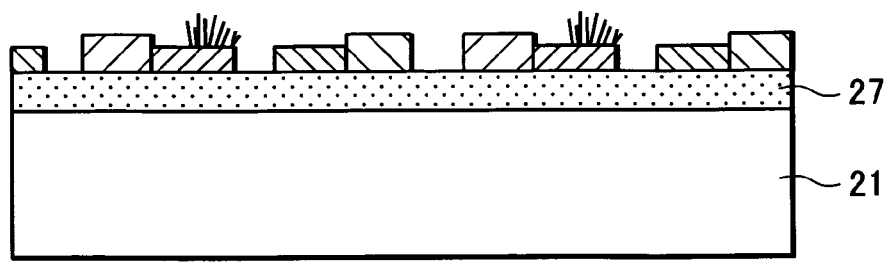
FIG. 4 is a cross-sectional view taken along line B-B of FIG. 3.

In FIG. 3 and FIG. 4, there are shown a substrate 21, a common wire electrode (scan line) 22, interlayer insulation layers 23a and 23b, cathode electrodes 24a and 24b, gate electrodes (extraction electrodes) 25a and 25b, fibrous material assemblies (graphite nanofiber assemblies in this embodiment) 26a and 26b, an antistatic film 27, and common wire electrodes (signal line) 28a and 28b.

The following describes a manufacturing procedure in this embodiment.

(1) The antistatic film 27 is formed in the same manner as in the process step (3) in the first embodiment on the entire surface of the substrate 21 made of PDP glass.

(2) TiN is deposited in a thickness of 100 nm on the surface of the substrate 21 where the aforementioned antistatic film 27 has been formed. Then, the cathode electrodes 24a, 24b and the gate electrodes (extraction electrodes) 25a, 25b are formed using the photolithographic technique.

(3) The common wire electrodes (signal lines) 28a and 28b are formed in a thickness of about 1 µm using a silver-type printing paste through printing and baking processes.

(4) The interlayer insulation layers 23a and 23b are formed in a thickness of about 20 µm using a printing paste composed of principal components of lead oxide and silica through printing and baking processes.

(5) The common wire electrode (scan line) 22 is formed in a thickness of about 2 µm using a silver-type printing paste through printing and baking processes.

(6) Pd—Co catalytic ultrafine particles are dispersed and applied onto the cathode electrodes 24a and 24b, dry etching using Ar is conducted, and a catalyst is attached to a partial region of the cathode electrodes 24a and 24b.

(7) By using an acetylene gas and a hydrogen gas, graphite nanofibers are generated in approx. 550 degrees C. via the catalytic ultrafine particles by low-pressure thermal CVD. Consequently, cathode regions are formed in the fibrous material assemblies 26a and 26b, each of which is an assembly of graphite nanofibers.

In the present invention, the graphite nanofiber differs from the carbon nano-tube in the structure of the carbon hexagonal net planes as stated above. Therefore, the graphite nanofiber and the carbon nano-tube are referred to distinctively.

Also in this embodiment, the antistatic film 27 is formed on the entire insulative surface of the electron emission element as well as the peripheral portion thereof, thereby reliably bringing out the charging performance.

As a result, it becomes possible to suppress a rise in the driving voltage and fluctuations in the beam position similarly to the first embodiment.

Third Embodiment

A third embodiment of the present invention will now be described with reference to FIG. 5.

In the third embodiment, an antistatic film is formed in a different method from that of the second embodiment in manufacturing an electron source having a similar configuration to that of the second embodiment shown in FIG. 3 and FIG. 4. FIG. 5 shows an explanatory diagram of the manufacturing procedure of the third embodiment.

Referring to FIG. 5, there are shown a substrate 21, a common wire electrode (scan line) 22, cathode electrodes 24a and 24b, gate electrodes (extraction electrodes) 25a and 25b, fibrous material assemblies (graphite nanofiber assemblies in this embodiment) 26a and 26b (FIG. 5D), an antistatic film 37, and common wire electrodes (signal lines) 28a and 28b, catalytic layers 39a and 39b, and resist patterns (stripped layers) 40a and 40b.

Although this configuration, preferably also includes the interlayer insulation layers 23a and 23b shown in FIG. 4, for convenience they are not shown in FIG. 5.

Skipping the process (1) in the second embodiment, the present procedure starts from the process (2) and terminated at the end of the process (5) of the second embodiment. The following describes the subsequent processes that are performed in the present embodiment.

(1) Pd—Co catalytic ultrafine particles are dispersed and applied onto the cathode electrodes 24a and 24b to form the catalytic layers 39a and 39b. Thereafter, the resist patterns 40a and 40b are formed by photoresist coating.

Figure 5A:
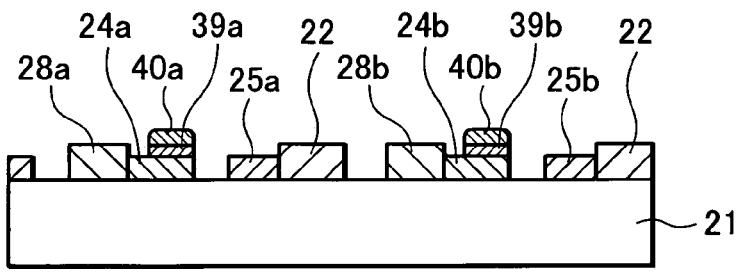
FIG. 5, consisting of FIGS. 5A to 5D, is an explanatory diagram of a manufacturing procedure in a third embodiment of the present invention.
Figure 5B:
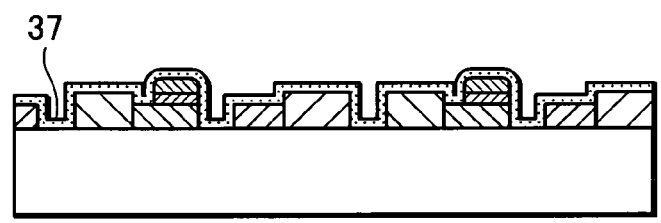

(2) Dry etching is conducted using Ar so as to leave behind the catalytic layers 39a and 39b covered with the resist patterns 40a and 40b in a partial region of the cathode electrodes 24a and 24b (FIG. 5(a)).

(3) Tin oxide of several nanometers is EB-deposited as the antistatic film 37 on the entire upper surface of overall device (including the substrate 21, etc.) (FIG. 5(b)).

Figure 5C:
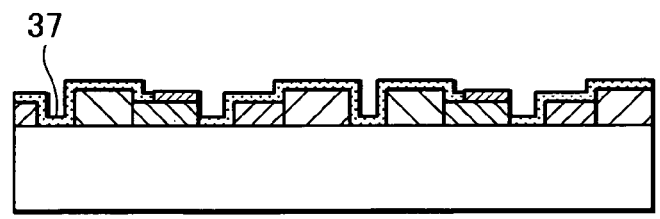
Figure 5D:
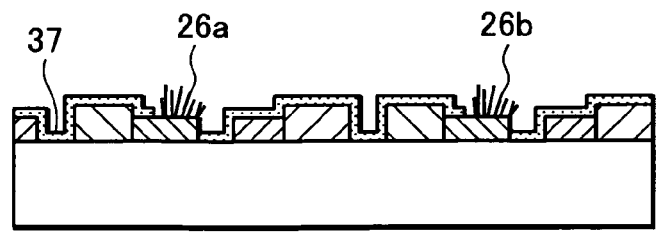

(4) The resist patterns 40a and 40b are stripped off by using a resist stripper (FIG. 5(c)).

(5) By using an acetylene gas and a hydrogen gas, graphite nanofibers are generated in approx. 550 degrees C. via the catalytic ultrafine particles of the catalytic layers 39a and 39b by low-pressure thermal CVD. Consequently, cathode regions are formed in the fibrous material assemblies 26a and 26b, each of which is an assembly of graphite nanofibers (FIG. 5(d)).

In this embodiment, the antistatic film 37 is formed not only on the surface of the substrate 21 exposed in the vicinity of the electron emission units made of the fibrous material assemblies 26a and 26b, but also on the upper surfaces of the common wire electrode (scan line) 22, the interlayer insulation layers 23a and 23b (not shown in FIG. 5), the cathode electrodes 24a and 24b, the gate electrodes (extraction electrodes) 25a and 25b, and the common wire electrodes (signal lines) 28a and 28b, thereby reliably bringing out the charging performance.

As a result, it becomes possible to suppress a rise in the driving voltage and fluctuations in the beam position similarly to the first and second embodiments.

Figure 6:
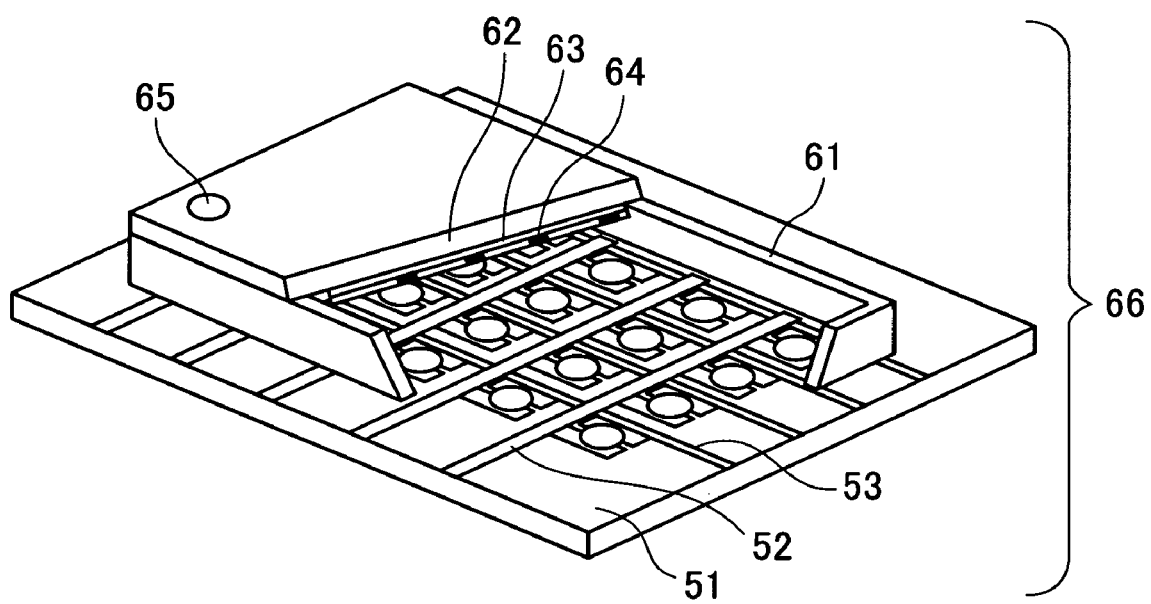
FIG. 6 is a schematic view of a display device of the present invention.

Each electron source of the present invention described above is applicable to a display device or a television set. The following describes a display device to which the electron source of the present invention is applied and a television set to which the display device is applied. Referring to FIG. 6, there is shown a schematic view of a display device 66 to which the electron source of any one of the aforementioned embodiments can be applied. The display device 66 in FIG. 6 comprises: an electron source substrate including a substrate 51, scan common wire electrodes 52 and signal common wire electrodes 53 formed on the substrate 51, and a plurality of electron emission elements electrically connected to these wires; and a face plate 62 having light-emitting members 64 and an accelerating electrode 63 on its surface. The electron source substrate and the face plate 62 are joined with each other via a frame member 61. A high-voltage terminal 65 applies a high voltage to the accelerating electrode 63. The display device has a drive circuit and a control circuit not shown (See FIG. 7). As described in the aforementioned embodiment, the display device emits electrons from the electron emission units of the electron emission elements and displays an image with an application of a desired voltage to the scan common wire electrodes 52 and the signal common wire electrodes 53.

Figure 7:
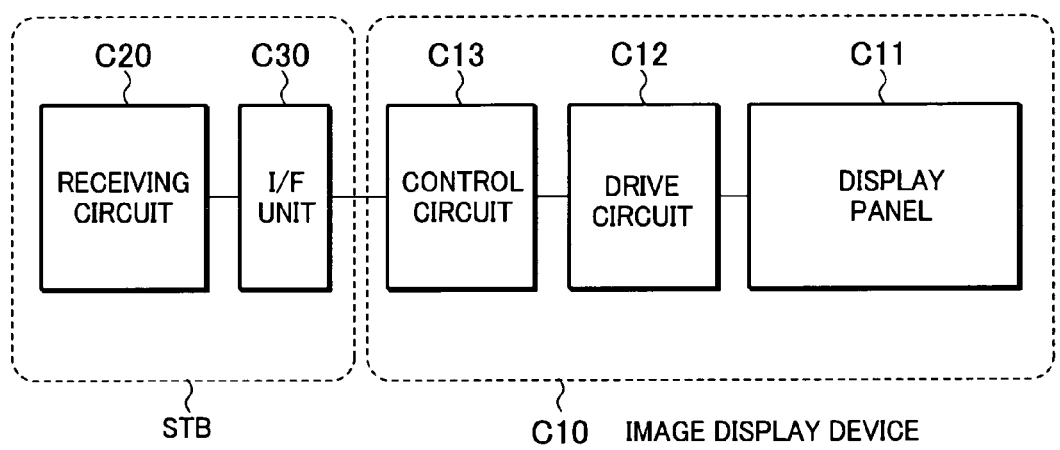
FIG. 7 is a schematic block diagram of a television set of the present invention.

Referring to FIG. 7, there is shown a block diagram of the television set according to a preferred embodiment of the present invention. A receiving circuit C20, which comprises a tuner, a decoder, and the like (not shown), receives television signals of satellite broadcasting or ground waves or receives data broadcasting via a network (not shown) and outputs decoded video data to an I/F unit (interface unit) C30. The I/F unit C30 converts the video data to a display format for the display device C10 and outputs image data to the display device C10. The display device C10 comprises a display panel C11, a drive circuit C12, and a control circuit C13. The aforementioned display device in FIG. 6 is applicable to this display device C10. The control circuit C13 conducts image processing such as correcting the input image data so as to be suitable for the display panel C11 and outputs image data and various control signals to the drive circuit C12. The drive circuit C12 outputs driving signals to the display panel C11 based on the input image data, thereby displaying television pictures.

The receiving circuit C20 and the I/F unit C30 can be housed as a set-top box (STB) in a case separate from the display device C10 or can be put in the same case as the display device C10.

In all of the electron emission element, the electron source, the image display device, and the television set according to the present invention, no antistatic film is formed in the electron emission unit made of the fibrous member. Therefore, they are free from deterioration in characteristics caused by bending, collapse, or dirt of the fibrous member due to an adhesion of the antistatic material or the like and can prevent abnormal discharge caused by the antistatic film.

Furthermore, according to the methods of manufacturing the electron emission element, the electron source, and the image display device of the present invention, the antistatic film is formed before the formation of the fibrous member, by which there is no possibility that the antistatic material will adhere to the fibrous material at the formation of the antistatic film. This prevents the harmful effect of the adhesion and reliably prevents the abnormal discharge caused by the antistatic film.

Therefore, according to the present invention, it is possible to achieve bright and clear pictures with a reduced feeling of noise caused by fluctuations due to a decrease in the color drift and uneven luminance even in an image display device having a large area.

This application claims priority from Japanese Patent Application No. 2003-432500 filed Dec. 26, 2003, which is hereby incorporated by reference herein in its entirety, as if fully set forth herein.

What is claimed is:

1. A method of manufacturing an electron emission element, comprising the steps of:
    forming an electrode on a substrate;
    forming a resist pattern covering at least a part of the electrode after the step of forming the electrode;
    forming an antistatic film at least on the substrate and the resist pattern after the step of forming the resist pattern,
    removing the resist pattern and the antistatic film on the resist pattern after the step of forming the antistatic film; and
    forming an electron emission unit made substantially of at least one fibrous member on the electrode after the step of removing the resist pattern.

2. A method of manufacturing an electron emission element according to claim 1, wherein the step of forming the antistatic film includes a step of applying a solution that contains an antistatic material or a dispersion liquid that contains an antistatic material at least on the substrate.

3. A method of manufacturing an electron emission element according to claim 1, wherein the step of forming the electron emission unit includes a step of forming a carbon nano-tube or a graphite nanofiber on the electrode.

* * * * *